US012689744B2

(12) United States Patent
Zhang et al.

(10) Patent No.: US 12,689,744 B2
(45) Date of Patent: Jul. 21, 2026

(54) METHODS AND SYSTEMS FOR COMPENSATING RECONSTRUCTED IMAGE FRAMES

(71) Applicant: ZHEJIANG DAHUA TECHNOLOGY CO., LTD., Hangzhou (CN)

(72) Inventors: Xue Zhang, Hangzhou (CN); Dong Jiang, Hangzhou (CN); Jucai Lin, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 507 days.

(21) Appl. No.: 18/171,397

(22) Filed: Feb. 20, 2023

(65) Prior Publication Data

US 2023/0206602 A1     Jun. 29, 2023

Related U.S. Application Data

(63) Continuation of application No. PCT/CN2021/143872, filed on Dec. 31, 2021.

(30) Foreign Application Priority Data

Feb. 22, 2021    (CN) ......................... 202110199486.6

(51) Int. Cl.
*H04N 19/176*        (2014.01)
*H04N 19/182*        (2014.01)

(52) U.S. Cl.
CPC ......... *H04N 19/176* (2014.11); *H04N 19/182* (2014.11)

(58) Field of Classification Search
CPC ... H04N 19/176; H04N 19/182; H04N 19/186
See application file for complete search history.

(56) References Cited

U.S. PATENT DOCUMENTS 10,638,130 B1    4/2020   Alakuijala et al.
2014/0348222 A1   11/2014  Hsiang et al.
(Continued)

FOREIGN PATENT DOCUMENTS

CN          111866507 A      10/2020
WO       2012092787 A1      7/2012
(Continued)

OTHER PUBLICATIONS

International Search Report in PCT/CN2021/143872 mailed on Mar. 30, 2022, 4 pages.
(Continued)

*Primary Examiner* — Peter K Huntsinger
(74) *Attorney, Agent, or Firm* — METIS IP LLC

(57) ABSTRACT

The present disclosure relates to systems and methods for image compensation. The systems may obtain a reconstructed image frame. The systems may determine a primary classification manner of pixels in the reconstructed image frame. The systems may determine a primary compensation value of each category of pixels in the reconstructed image frame that are classified based on the primary classification manner. The systems may obtain a compensated image frame by compensating the reconstructed image frame based on the primary compensation value of each category of pixels in the reconstructed image frame.

20 Claims, 7 Drawing Sheets

(56) References Cited

U.S. PATENT DOCUMENTS

| | | | |
|---|---|---|---|
| 2015/0237376 A1 | 8/2015 | Alshina et al. |
| 2018/0124408 A1 | 5/2018 | Choi et al. |
| 2018/0367815 A1 | 12/2018 | Laroche et al. |
| 2019/0297350 A1 | 9/2019 | Lin et al. |
| 2019/0320170 A1 | 10/2019 | Jang et al. |
| 2020/0336754 A1 | 10/2020 | Sasaki |
| 2022/0116664 A1 | 4/2022 | Ma et al. |

FOREIGN PATENT DOCUMENTS

| | | | |
|---|---|---|---|
| WO | 2019233999 A1 | 12/2019 |
| WO | 2022174685 A1 | 8/2022 |
| WO | 2023274074 A1 | 1/2023 |

OTHER PUBLICATIONS

Written Opinion in PCT/CN2021/143872 mailed on Mar. 30, 2022, 5 pages.
First Office Action in Chinese Application No. 202110199486.6 mailed on May 30, 2022, 19 pages.
Telecommunication Standardization Sector of ITU, ITU-T H.265, 2015, 635 pages.
Jian, Yunrui et al., Enhanced Cross Component Sample Adaptive Offset for AVS3, 2021 International Conference on Visual Communications and Image Processing (VCIP), 2021, 5 pages.
The Extended European Search Report in European Application No. 21926397.7 mailed on Oct. 31, 2023, 10 pages.

<u>100</u>

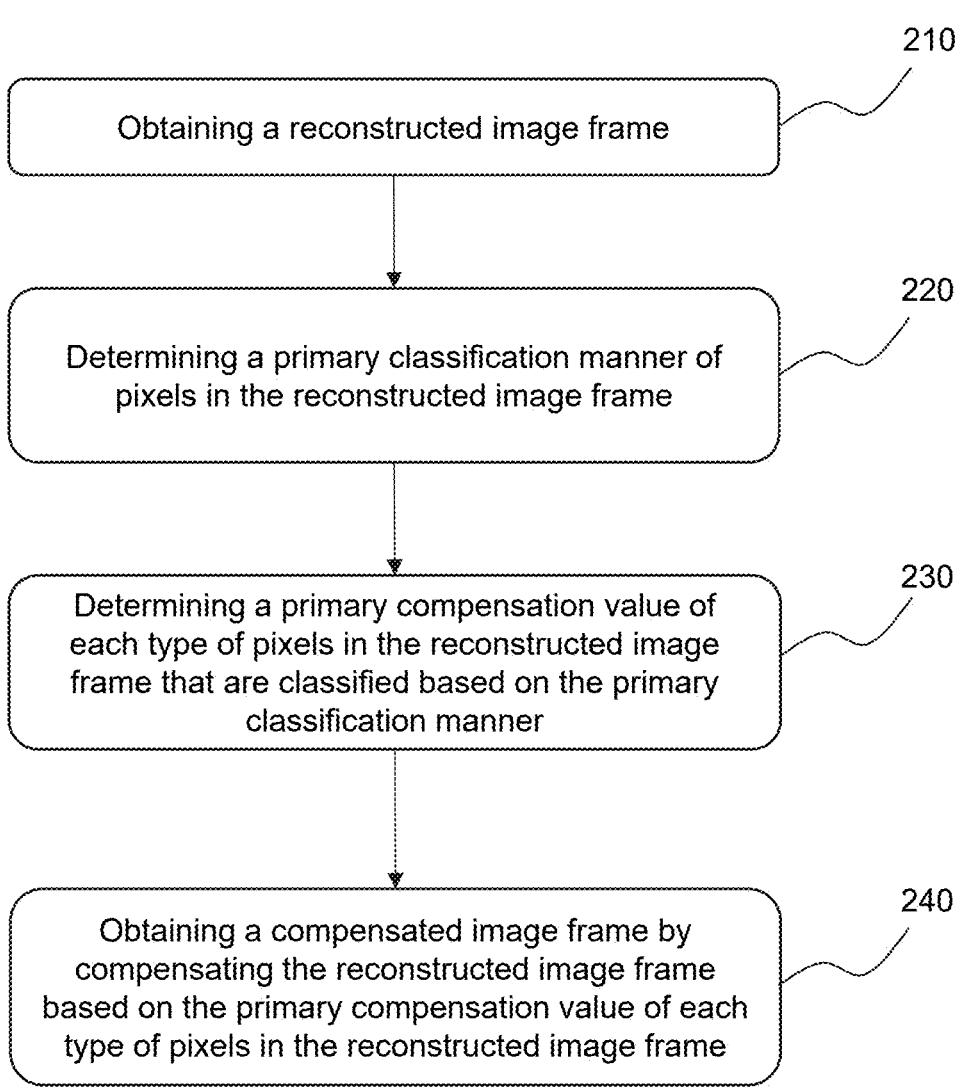

200

210

Obtaining a reconstructed image frame

220

Determining a primary classification manner of pixels in the reconstructed image frame

230

Determining a primary compensation value of each type of pixels in the reconstructed image frame that are classified based on the primary classification manner

240

Obtaining a compensated image frame by compensating the reconstructed image frame based on the primary compensation value of each type of pixels in the reconstructed image frame

FIG. 2

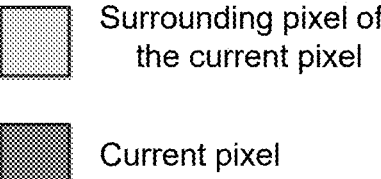 Surrounding pixel of
the current pixel
Current pixel
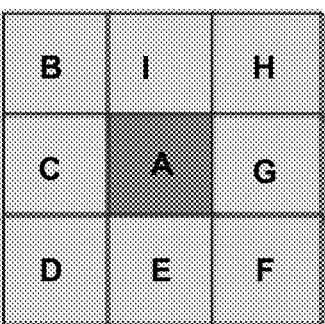
Reconstructed image frame
FIG. 3

<u>400</u>

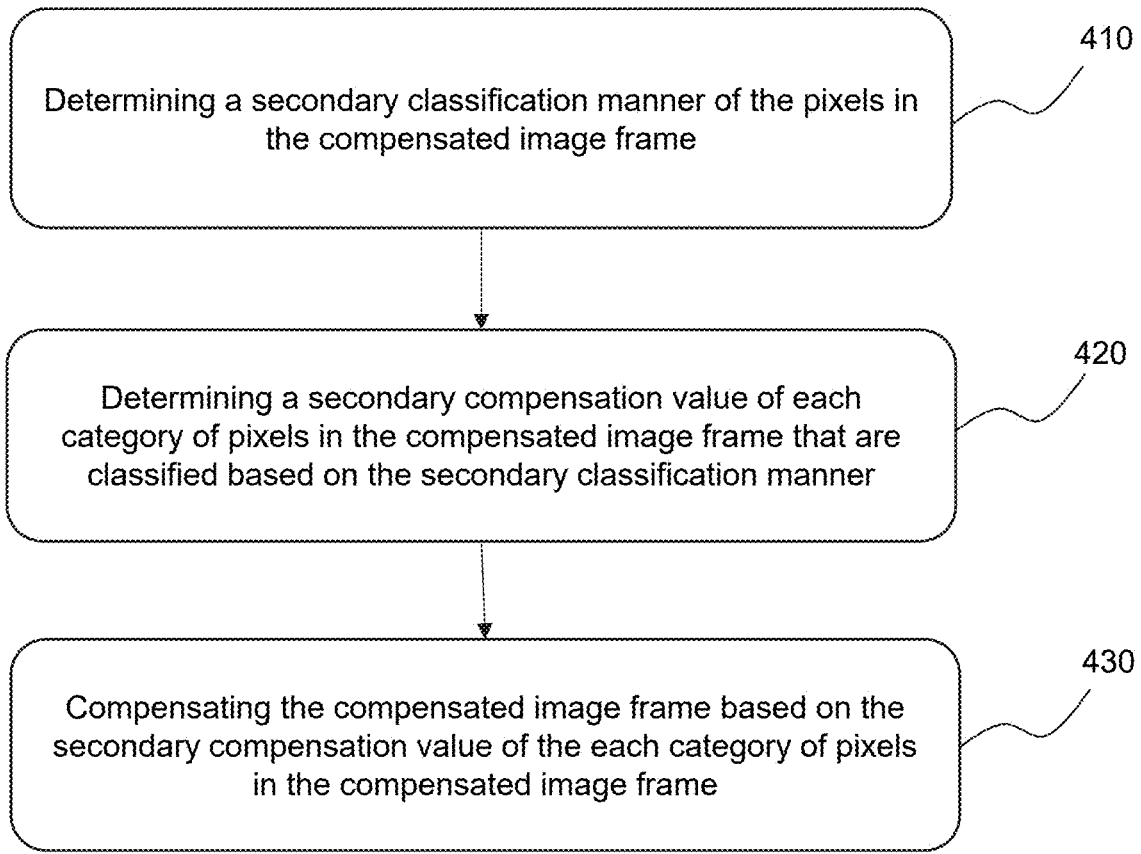

Determining a secondary classification manner of the pixels in the compensated image frame

410

Determining a secondary compensation value of each category of pixels in the compensated image frame that are classified based on the secondary classification manner

420

Compensating the compensated image frame based on the secondary compensation value of the each category of pixels in the compensated image frame

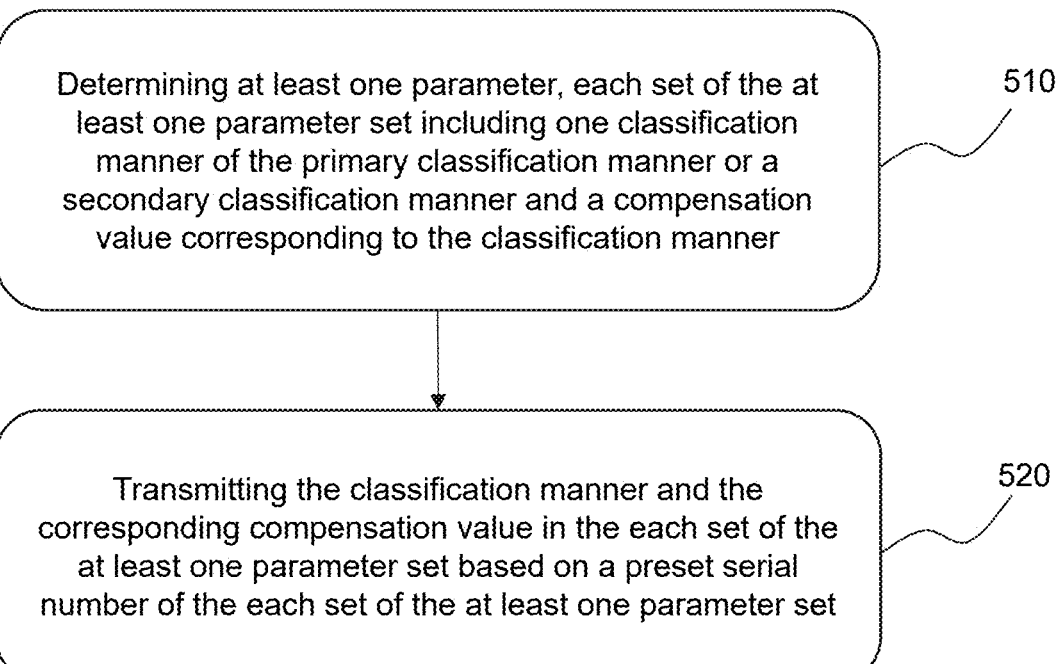

Determining at least one parameter, each set of the at least one parameter set including one classification manner of the primary classification manner or a secondary classification manner and a compensation value corresponding to the classification manner

510

Transmitting the classification manner and the corresponding compensation value in the each set of the at least one parameter set based on a preset serial number of the each set of the at least one parameter set

METHODS AND SYSTEMS FOR COMPENSATING RECONSTRUCTED IMAGE FRAMES

CROSS-REFERENCE TO RELATED APPLICATION

This application is a Continuation of International Application No. PCT/CN2021/143872 filed on Dec. 31, 2021, which claims priority to Chinese Patent Application No. 202110199486.6, filed on Feb. 22, 2021, the contents of each of which are hereby incorporated by reference.

TECHNICAL FIELD

The present disclosure relates to video coding technology, and in particular, to systems and methods for image compensation.

BACKGROUND

In an existing image compensation technique, chrominance components of an image frame are classified only according to pixel values of pixels in the image frame, which may reduce the accuracy of the classification. In addition, the existing image compensation is not fine enough and needs to be improved. Besides, in an existing enhanced sample adaptive offset (ESAO) technique, an image frame is compensated using a same parameter set. In other words, the same classification manner and a compensation value corresponding to the classification manner are adopted by all coding units in the image frame, which may be regarded as a relatively coarse filtering operation. As a result, the correction of the pixel values of the pixels in the image frame is not fine and flexible enough.

Therefore, it is desirable to provide improved systems and methods for image compensation, which may improve the accuracy of the classification of the chrominance components, coding efficiency, and the fineness of the image compensation, thereby better correcting the pixel values of the pixels in the image frame.

SUMMARY

An aspect of the present disclosure relates to a method for image compensation. The method may include obtaining a reconstructed image frame; determining a primary classification manner of pixels in the reconstructed image frame; determining a primary compensation value of each category of pixels in the reconstructed image frame that are classified based on the primary classification manner; and obtaining a compensated image frame by compensating the reconstructed image frame based on the primary compensation value of each category of pixels in the reconstructed image frame.

In some embodiments, the primary classification manner may include a first classification mode. The determining the primary compensation value of each category of pixels in the reconstructed image frame that are classified based on the primary classification manner may include classifying the pixels in the reconstructed image frame into at least one category based on the first classification mode and determining the primary compensation value of each category of pixels in the reconstructed image frame. The first classification mode may be configured to classify the pixels in the reconstructed image frame based on a relationship between a current pixel in the reconstructed image frame and surrounding pixels of the current pixel.

In some embodiments, the primary classification manner may further include a first classification mode and a second classification mode. The determining the primary compensation value of each category of pixels in the reconstructed image frame that are classified based on the primary classification manner may include classifying the pixels in the reconstructed image frame into a plurality of categories based on the first classification mode and the second classification mode and determining the primary compensation value of each category of the plurality of categories of pixels in the reconstructed image frame. The second classification mode may be configured to classify the pixels in the reconstructed image frame based on pixel values of the pixels in the reconstructed image frame.

In some embodiments, the method may further include determining a secondary classification manner of the pixels in the compensated image frame; determining a secondary compensation value of each category of pixels in the compensated image frame that are classified based on the secondary classification manner; and compensating the compensated image frame based on the secondary compensation value of the each category of pixels in the compensated image frame.

In some embodiments, the primary classification manner may be a first classification mode.

In some embodiments, the primary classification manner may be a first classification mode and a second classification mode.

In some embodiments, the determining the primary classification manner of the pixels in the reconstructed image frame may include determining, from a plurality of candidate classification modes, one candidate classification mode corresponding to an optimal value of a plurality of optimal compensation values that correspond to the plurality of candidate classification modes as the primary classification manner.

In some embodiments, the method may further include determining at least one parameter set. Each set of the at least one parameter set may include one classification manner of the primary classification manner or a secondary classification manner and a compensation value corresponding to the classification manner. The method may further include transmitting the classification manner and the corresponding compensation value in the each set of the at least one parameter set based on a preset serial number of the each set of the at least one parameter set.

In some embodiments, the at least one parameter set may be applied to a chrominance component of the reconstructed image frame or the compensated image frame.

In some embodiments, the method may further include determining, based on an opening situation of a filtering operation in a syntactic representation associated with the reconstructed image frame or the compensated image frame, whether to apply the at least one parameter set to the reconstructed image frame or the compensated image frame.

A further aspect of the present disclosure relates to a system for image compensation. The system may include at least one storage device including a set of instructions and at least one processor in communication with the at least one storage device. When executing the set of instructions, the at least one processor may be directed to cause the system to implement operations. The operations may include obtaining a reconstructed image frame; determining a primary classification manner of pixels in the reconstructed image frame; determining a primary compensation value of each category of pixels in the reconstructed image frame that are classified based on the primary classification manner; and obtaining a compensated image frame by compensating the reconstructed image frame based on the primary compensation value of each category of pixels in the reconstructed image frame.

A still further aspect of the present disclosure relates to a system for image compensation. The system may include an obtaining module, a first determination module, a second determination module, and a compensation module. The obtaining module may be configured to obtain a reconstructed image frame. The first determination module may be configured to determine a primary classification manner of pixels in the reconstructed image frame. The second determination module may be configured to determine a primary compensation value of each category of pixels in the reconstructed image frame that are classified based on the primary classification manner. The compensation module may be configured to obtain a compensated image frame by compensating the reconstructed image frame based on the primary compensation value of each category of pixels in the reconstructed image frame.

A still further aspect of the present disclosure relates to a non-transitory computer readable medium including executable instructions. When the executable instructions are executed by at least one processor, the executable instructions may direct the at least one processor to perform a method. The method may include obtaining a reconstructed image frame; determining a primary classification manner of pixels in the reconstructed image frame; determining a primary compensation value of each category of pixels in the reconstructed image frame that are classified based on the primary classification manner; and obtaining a compensated image frame by compensating the reconstructed image frame based on the primary compensation value of each category of pixels in the reconstructed image frame.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 is a flowchart illustrating an exemplary process for image compensation according to some embodiments of the present disclosure;

FIG. 3 is a schematic diagram illustrating an exemplary current pixel and surrounding pixels of the current pixel according to some embodiments of the present disclosure;

FIG. 4 is a flowchart illustrating an exemplary process for compensating a compensated image frame according to some embodiments of the present disclosure;

FIG. 5 is a flowchart illustrating an exemplary process for determining and transmitting at least one parameter set according to some embodiments of the present disclosure;

DETAILED DESCRIPTION

Figure 1:
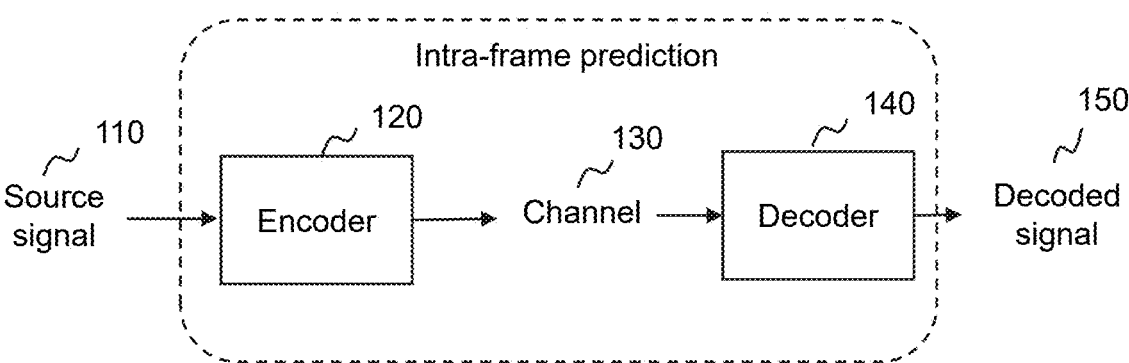
FIG. 1 is a schematic diagram illustrating an exemplary video processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It should be understood that the term "encoding unit," "current block," "encoding block," or "block," used herein refer to a basic unit of image processing or a specific position in an image and are used interchangeably. In addition, in the description of the present disclosure, the term "unit" includes all concepts of encoding unit, prediction unit, and transformation unit.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.\

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an exemplary video processing system according to some embodiments of the present disclosure.

In some embodiments, a video processing system 100 may be applied to a video compression system, such as an air television broadcasting system, a cable television transmission system, a satellite television transmission system, an Internet video transmission system, a digital video stored in media, or the like. As used herein, video compression refers to a process of reducing the amount of data required to present a video. The purpose of the video compression may be to reduce redundant information in the video data so as to store and transmit the video data effectively.

As shown in FIG. 1, the video processing system 100 may include a source signal 110, an encoder 120, a channel 130, a decoder 140, and a decoded signal 150.

In some embodiments, the source signal 110 may refer to a video signal (also referred to as a video source or a video source signal). In some embodiments, the video source signal may refer to uncompressed dynamic images, for example, dynamic images in a digital video format.

The video source signal may include a plurality of image frames. Each of the plurality of image frames may include a plurality of pixels. A color coding manner of the video source signal may include YUV and RGB (R represents red, G represents green, and B represents blue). Merely by way of example, the YUY may include a luminance component Y and chrominance components U and V.

In the video processing process, an intra-frame prediction may be configured to compress the video source signal by removing spatial redundant information in the video source signal based on a strong correlation between adjacent pixels in a same image frame. In some embodiments, the intra-frame prediction may be implemented by the encoder 120 and the decoder 140.

In some embodiments, the encoder 120 may refer to a signal compression standard completed by software and/or hardware applications. The encoder 120 may be configured to compress the video source signal at a sending end to obtain an encoded video source signal (i.e., an encoded source signal).

In some embodiments, the decoder 140 may refer to a signal compression standard completed by software or hardware applications. The source decoder 140 may be configured to generate an approximation of the video source signal in a decoding end for playback.

In some embodiments, the encoder 120 may perform transformation and quantization operations on residual information of the video source signal generated by the intra-frame prediction. The residual information may be encoded through entropy coding and transmitted to the decoding end. The decoder 140 may extract the residual information from information transmitted from the encoder 120, and further determine a reconstructed value of the video source signal by combining a predicted value obtained by motion estimation.

In some embodiments, the channel 130 may transmit or store encoded video data (e.g., the compressed/encoded video source signal). The channel 130 may include a wireless channel, a wired channel, or a frequency band. The channel 130 may include a twisted pair, a cable, an optical fiber, or a medium that may propagate electromagnetic waves.

In some embodiments, the decoded signal 150 may refer to data (i.e., video data after being compressed and decompressed) reconstructed from the source signal 110 after being encoded and decoded.

In some embodiments, the encoded video data (e.g., the compressed/encoded video source signal) may be stored in a storage device (e.g., a hard disk), and the encoded video data may be read from the storage device during a subsequent decoding processing process.

In some embodiments, the video processing system 100 may further include a channel encoder. The channel encoder may refer to a device or program that may further encode the encoded video source signal before channel transmission at the sending end. The channel encoder may be configured to perform an error correction. In some embodiments, the video processing system 100 may further include a channel decoder. The channel decoder may be configured at a receiving end to detect and correct an error in data transmission. The encoded video source signal may be unzipped by the channel decoder.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 2 is a flowchart illustrating an exemplary process for image compensation according to some embodiments of the present disclosure. In some embodiments, process 200 may be implemented by an image compensation system (e.g., an image compensation system 600 illustrated in FIG. 6). In some embodiments, the image compensation system may be implemented by software and/or hardware, and/or may be integrated into an image compensation device (e.g., an image compensation device 700 illustrated in FIG. 7) that includes a processing device (e.g., a processing device 710). In some embodiments, at least part of process 200 may be performed by the processing device including at least one processor and a storage device (e.g., a storage 720). For example, process 200 may be stored in the storage device in the form of instructions (e.g., an application), and invoked and/or executed by the processing device. The operations of the illustrated process presented below are intended to be illustrative. In some embodiments, process 200 may be accomplished with one or more additional operations not described, and/or without one or more of the operations discussed. Additionally, the order in which the operations of the process 200 as illustrated in FIG. 2 and described below is not intended to be limiting.

In 210, a reconstructed image frame may be obtained. In some embodiments, operation 210 may be performed by an obtaining module 610. As used herein, the reconstructed image frame may refer to an image frame that has been predicted. for example, after being predicted, a source signal (e.g., the source signal 110) may be used as the reconstructed image frame. In some embodiments, the reconstructed image frame may be previously obtained and stored in a storage device (e.g., a storage 720). The reconstructed image frame may be obtained from the storage device via a network.

In 220, a primary classification manner of pixels in the reconstructed image frame may be determined. In some embodiments, operation 220 may be performed by a determination module 620.

In some embodiments, the primary classification manner may be used to classify pixels in the reconstructed image frame.

In some embodiments, the primary classification manner may include a first classification mode. The pixels in the reconstructed image frame may be classified into at least one category based on the first classification mode. The first classification mode may be configured to classify the pixels in the reconstructed image frame based on a relationship between a current pixel in the reconstructed image frame and surrounding pixels of the current pixel. Merely by way of example, the relationship between the current pixel in the reconstructed image frame and the surrounding pixels of the current pixel may be a relationship between a pixel value of the current pixel in the reconstructed image frame and pixel values of the surrounding pixels of the current pixel.

In some embodiments, the current pixel may refer to a certain pixel that needs to be classified in the reconstructed image frame. For example, as shown in FIG. 3, a pixel A in a reconstructed image frame may be the current pixel.

A surrounding pixel of the current pixel may refer to a pixel adjacent to the current pixel and no other pixel located between the current pixel and the surrounding pixel. In other words, the current pixel and a surrounding pixel may have a same boundary. For example, as shown in FIG. 3, pixels B, C, D, E, F, G, H, and I may be the surrounding pixels of the current pixel A.

In some embodiments, a first category combination may be determined by classifying the pixels in the reconstructed image frame based on a relationship between each pixel (also referred to as each current pixel) of the pixels in the reconstructed image frame and surrounding pixels of the pixel. The first category combination may include a classification result of the pixels in the reconstructed image frame according to the first classification mode. The classification result of the pixels may include the at least one category of pixels.

In some embodiments, the first classification mode may include a first classification sub-mode, a second classification sub-mode, or a third classification sub-mode. The pixels in the reconstructed image frame may be classified into 17 categories based on the first classification sub-mode, that is the first category combination is 17 categories. The pixels in the reconstructed image frame may be classified into 9 categories based on the second classification sub-mode, that is the first category combination is 9 categories. The pixels in the reconstructed image frame may be classified into 1 category based on the third classification sub-mode, that is the first category combination is 1 category.

In some embodiments, the classification result obtained based on a classification sub-mode may be determined by classifying the pixels in the reconstructed image frame based on a relationship between each pixel (also referred to as each current pixel) of the pixels in the reconstructed image frame and surrounding pixels of the pixel. In some embodiments, the classification result determined based on the classification sub-mode may be determined by comparing a pixel value of each current pixel and the pixel values of the surrounding pixels of the current pixel.

For example, the formulas of the first classification sub-mode and the second classification sub-mode are shown in Table 1.

TABLE 1

| First classification sub-mode | Second classification sub-mode |
|---|---|
| Initial: Cl = 0; <br> for $\|k_1 - i\| \leq 1$, $\|k_2 - j\| \leq 1$: <br> $\quad$ if $Y_{(k1,k2)} > Y_{(i,j)}$: <br> $\quad\quad$ Cl+= 1 <br> $\quad$ else if $Y_{(k1,k2)} < Y_{(i,j)}$: <br> $\quad\quad$ Cl+= −1 | Initial: Cl = 0; <br> for $\|k_1 - i\| \leq 1$, $\|k_2 - j\| \leq 1$: <br> $\quad$ if $Y_{(k1,k2)} > Y_{(i,j)}$: <br> $\quad\quad$ Cl+= 1 |

In Table 1, different values of Cl refer to different categories, $Y_{(i,j)}$ refers to the pixel value of the current pixel (i, j), $Y_{(k_1,k_2)}$ refers to a pixel value of a surrounding pixel $(k_1, k_2)$ of the current pixel. A value range of Cl in the first classification sub-mode is [−8, 8], which includes 17 values each of which corresponds to a category. A value range of Cl in the second classification sub-mode is [0, 8], which includes 9 values each of which corresponds to a category.

According to the above embodiments, the relationship between the current pixel and the surrounding pixels of the current pixel is used to classify the pixels in the reconstructed image frame, which may improve the accuracy of the classification result of the pixels in the reconstructed image frame, thereby improving the compensation accuracy of the image compensation.

In some embodiments, the primary classification manner may include the first classification mode and a second classification mode. The pixel in the reconstructed image frame may be classified into a plurality of categories based on the first classification mode and the second classification mode. The second classification mode may be configured to classify the pixels in the reconstructed image frame based on pixel values of the pixels in the reconstructed image frame.

In some embodiments, a second category combination may be determined by classifying the pixels in the reconstructed image frame based on the pixel values of the pixels in the reconstructed image frame. The second category combination may be a classification result of the pixels in the reconstructed image frame according to the second classification mode. In some embodiments, the second category combination may be determined by comparing the pixel values of the pixels in the reconstructed image frame.

In some embodiments, if the first classification mode is the first classification sub-mode or the second classification sub-mode, the second classification mode may include one of 16 classification sub-modes. If the first classification mode is the third classification sub-mode, the second classification mode may include one of 96 classification sub-modes. The pixel values of the pixels in the reconstructed image frame may be divided into multiple ranges (i.e., categories) based on each classification sub-mode in the second classification mode. For example, the pixel values of the pixels in the reconstructed image frame may be divided into 2 equal ranges (i.e., 2 categories) based on a first sub-mode among the 96 classification sub-modes, or the pixel values of the pixels in the reconstructed image frame may be divided into 272 equal ranges based on a 96th classification sub-mode among the 96 classification sub-modes. Different classification sub-modes may correspond to different counts of the multiple ranges (i.e., categories). Each of the multiple ranges may correspond to a category of pixels in the reconstructed image frame. For a specific classification sub-mode, a range in which a pixel is located is the category of the pixel.

For example, the first classification sub-mode, the second classification sub-mode, and the third classification sub-mode may be denoted as a sub-mode 1-0, a sub-mode 1-1, and a sub-mode 1-2, respectively. When the first classification mode is the sub-mode 1-0 or the sub-mode 1-1, the second classification mode may include 16 classification sub-modes. The 16 classification sub-modes (denoted as a sub-mode 2-0, a sub-mode 2-1, . . . , a sub-mode 2-15) may classify the pixels in the reconstructed image frame into 1 category, 2 categories, . . . , 16 categories, respectively. When the first classification mode is the sub-mode 1-2, the second classification mode may include 96 classification sub-modes. The 96 classification sub-modes may classify the pixels in the reconstructed image frame into 2 categories, 4 categories, . . . , 272 categories (denoted as a sub-mode 2-0' a sub-mode 2-1', . . . , a sub-mode 2-95'), respectively.

In some embodiments, a third category combination may be determined by combining the first category combination and the second category combination. The third category combination may be a classification result of the pixels in the reconstructed image frame.

In some embodiments, the first category combination and the second category combination may be combined by a Cartesian product algorithm. For example, if the first category combination determined based on the first classification sub-mode in the first classification mode includes 17 categories of pixels, and the second category combination determined based on a classification sub-mode in the second classification mode includes 10 categories of pixels, the third category combination determined by combining the first category combination and the second category combination by the Cartesian product algorithm includes 170 of pixels. For example, for each category among the 17 categories of pixels determined based on the first classification mode, the category may be combined with each category among the 10 categories of pixels determined based on the second classification mode to form a category in the third category combination.

In some embodiments, a plurality of candidate classification modes may be obtained. The plurality of candidate classification modes may include the first classification mode, the second classification mode, and a combination of the first classification mode and the second classification mode. For each of the plurality of candidate classification modes, an optimal compensation value of a plurality of compensation values that correspond to a plurality of candidate classification sub-modes in the candidate classification mode may be determined. In some embodiments, the optimal compensation value may refer to a compensation value with a smallest rate-distortion cost in the plurality of compensation values. For example, for the first classification mode, an optimal compensation value of a plurality of compensation values that correspond to the first classification sub-mode (e.g., the sub-mode 1-0), the second classification sub-mode (e.g., the sub-mode 1-1), and the third classification sub-mode (e.g., the sub-mode 1-2) in first classification mode may be determined. As another example, for the second classification mode, an optimal compensation value of a plurality of compensation values that correspond to the classification sub-modes (e.g., the sub-mode 2-0, the sub-mode 2-1, . . . , the sub-mode 2-15) in second classification mode may be determined. Further, an optimal value (i.e., an optimal compensation value with a smallest rate-distortion cost) of a plurality of optimal compensation values corresponding to the plurality of candidate classification modes may be determined. A candidate classification mode among the plurality of candidate classification modes corresponding to the optimal value may be the primary classification manner. For example, if the candidate classification mode corresponding to the optimal value is the combination of the first classification mode and the second classification mode, the combination of the first classification mode and the second classification mode may be designated as the primary classification manner.

In 230, a primary compensation value of each category of pixels in the reconstructed image frame that are classified based on the primary classification manner may be determined. In some embodiments, operation 230 may be performed by a second determination module 630.

In some embodiments, a primary compensation value may refer to a compensation value (i.e., the optimal value mentioned in the above embodiments) corresponding to the primary classification manner. For example, if the primary classification manner is the first classification mode, the primary compensation value may be a compensation value of each category of pixels in the reconstructed image frame that are classified based on the first classification mode. As another example, if the primary classification manner is the second classification mode, the primary compensation value may be a compensation value of each category of pixels in the reconstructed image frame that are classified based on the second classification mode. For a further example, if the primary classification manner is the combination of the first classification mode and the second classification mode, the primary compensation value may be a compensation value of each category of pixels in the reconstructed image frame that are classified based on the combination of the first classification mode and the second classification mode.

In 240, a compensated image frame may be obtained by compensating the reconstructed image frame based on the primary compensation value of each category of pixels in the reconstructed image frame. In some embodiments, operation 240 may be performed by a compensation module 630.

In some embodiments, if the primary classification manner is the first classification mode, the reconstructed image frame may be compensated using the compensation value of each category of pixels in the reconstructed image frame that are classified based on the first classification mode. In some embodiments, if the primary classification manner is the second classification mode, the reconstructed image frame may be compensated using the compensation value of each category of pixels in the reconstructed image frame that are classified based on the second classification mode. In some embodiments, if the primary classification manner is the combination of the first classification mode and the second classification mode, the reconstructed image frame may be compensated using the compensation value of each category of pixels in the reconstructed image frame that are classified based on the combination of the first classification mode and the second classification mode.

In some embodiments, in an encoding end (e.g., the encoder 120 illustrated in FIG. 1), a code stream of the compensated image frame may be obtained by encoding the reconstructed image frame using the primary compensation value of each category of pixels in the reconstructed image frame. The code stream may include a syntactic element. The syntactic element may include the primary compensation value and a filter flag. In some embodiments, in a decoding end (e.g., the decoder 140 illustrated in FIG. 1), the code stream may be decoded based on the primary compensation value of each category of pixels in the reconstructed image frame. For example, if the primary classification manner is a combination of the sub-mode 1-0 in the first classification mode and the sub-mode 2-0 in the second classification mode, the pixels in the reconstructed image frame may be classified into 17 categories based on the sub-mode 1-0 and 1 category based on the sub-mode 2-0. A Cartesian product of the 17 categories and the 1 category is 17. Therefore, there are 17 primary compensation values of 17 categories of pixels in the reconstructed image frame. In the decoding end, the code stream may be decoded using the 17 primary compensation values of 17 categories of pixels in the reconstructed image frame. As another example, if the primary classification manner is a combination of the sub-mode 1-2 in the first classification mode and the sub-mode 2-95' in the second classification mode, the pixels in the reconstructed image frame may be classified into 1 category based on the sub-mode 1-2 and 272 categories based on the sub-mode 2-95'. A Cartesian product of the 1 category and the 272 categories is 272. Therefore, there are 272 primary compensation values of 272 categories of pixels in the reconstructed image frame. In the decoding end, the code stream may be decoded using the 272 primary compensation values of 272 categories of pixels in the reconstructed image frame.

According to the above embodiments, in the image compensation, the pixels in the reconstructed image frame may be classified not only based on the pixel values of the pixels in the reconstructed image frame, but also based on the relationship between the current pixel in the reconstructed image frame and the surrounding pixels of the current pixel, which may improve the accuracy of the classification result of the pixels in the reconstructed image frame, thereby improving the compensation accuracy of the image compensation and the encoding efficiency.

In some embodiments, the compensated image frame may be further compensated. Specifically, a secondary classification manner of the pixels in the compensated image frame may be determined. According to the secondary classification manner, a secondary compensation value of each category of pixels in the compensated image frame that are classified based on the secondary classification manner may be determined. Further, the compensated image frame may be compensated based on the secondary compensation value of the each category of pixels in the compensated image frame. More descriptions regarding the compensation of the compensated image frame may be found elsewhere in the present disclosure, for example, FIG. 4 and relevant descriptions thereof.

In some embodiments, at least one parameter set may be determined. Each set of the at least one parameter set may include one classification manner of the primary classification manner or the secondary classification manner and a compensation value corresponding to the classification manner. Further, the classification manner and the corresponding compensation value in the each set of the at least one parameter set may be transmitted, based on a serial number of the each set of the at least one parameter set. More descriptions regarding the at least one parameter set may be found elsewhere in the present disclosure, for example, FIG. 5 and relevant descriptions thereof.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 4 is a flowchart illustrating an exemplary process for compensating a compensated image frame according to some embodiments of the present disclosure. In some embodiments, process 400 may be implemented by an image compensation system (e.g., an image compensation system 600 illustrated in FIG. 6). In some embodiments, the image compensation system may be implemented by software and/or hardware, and/or may be integrated into an image compensation device (e.g., an image compensation device 700 illustrated in FIG. 7) that includes a processing device (e.g., a processing device 710). In some embodiments, at least part of process 400 may be performed by the processing device including at least one processor and a storage device (e.g., a storage 720). For example, process 400 may be stored in the storage device in the form of instructions (e.g., an application), and invoked and/or executed by the processing device. The operations of the illustrated process presented below are intended to be illustrative. In some embodiments, process 400 may be accomplished with one or more additional operations not described, and/or without one or more of the operations discussed. Additionally, the order in which the operations of the process 400 as illustrated in FIG. 4 and described below is not intended to be limiting.

In 410, a secondary classification manner of the pixels in a compensated image frame may be determined. In some embodiments, operation 410 may be performed by the compensation module 640.

In some embodiments, after a compensated image frame is obtained by compensating a reconstructed image frame, the secondary classification manner of the pixels in the compensated image frame may be determined. The compensated image frame may be obtained as described in connection with FIG. 2.

In some embodiments, the secondary classification manner and the primary classification manner may be different. For example, the primary classification manner may be the first classification mode, and the secondary classification manner may be the combination of the first classification mode and the second classification mode. As another example, the primary classification manner may be the combination of the first classification mode and the second classification mode, and the secondary classification manner may be the first classification mode.

In 420, a secondary compensation value of each category of pixels in the compensated image frame that are classified based on the secondary classification manner may be determined based on the secondary classification manner. In some embodiments, operation 420 may be performed by the compensation module 640.

In some embodiments, a secondary compensation value may refer to a compensation value corresponding to the secondary classification manner. For example, if the secondary classification manner is the first classification mode, the secondary compensation value may be a compensation value of each category of pixels in the compensated image frame that are classified based on the first classification mode. As another example, if the secondary classification manner is the second classification mode, the secondary compensation value may be a compensation value of each category of pixels in the compensated image frame that are classified based on the second classification mode. For example, if the secondary classification manner is the combination of the first classification mode and the second classification mode, the secondary compensation value may be a compensation value of each category of pixels in the compensated image frame that are classified based on the combination of the first classification mode and the second classification mode.

In 430, the compensated image frame may be compensated based on the secondary compensation value of the each category of pixels in the compensated image frame. In some embodiments, operation 430 may be performed by the compensation module 640.

In some embodiments, the pixels in the reconstructed image frame may be classified according to the first classification mode (e.g., the first classification sub-mode), and the first category combination (e.g., including 17 categories of pixels in the reconstructed image frame) may be obtained. The primary compensation values of the first category combination may be used to compensate the reconstructed image frame to obtain the compensated image frame. Further, the secondary classification manner may include the second classification mode as described in FIG. 2, and the pixels in the compensated image frame may be classified according to the second classification mode (e.g., the sub-mode 2-15), and a second category combination (e.g., including 16 categories of pixels in the compensated image frame) may be obtained. The secondary compensation value of the second category combination may be used to compensate the compensated image frame. In some embodiments, the pixels in the reconstructed image frame may be classified according to the second classification mode, and accordingly, the reconstructed image frame may be compensated to obtain the compensated image frame. Further, the secondary classification manner may include the first classification mode as described in FIG. 2, and the pixels in the compensated image frame may be classified according to the first classification mode, and accordingly, the compensated image frame may be further compensated.

In some embodiments, each pixel in the reconstructed image frame or the compensated image frame may include a chrominance component and two luminance components. The pixels in the reconstructed image frame or the compensated image frame may be classified by classifying the chrominance components or the luminance components of the pixels in the reconstructed image frame or the compensated image frame based on the above classification manner. For example, the pixels in the reconstructed image frame may be classified by classifying the chrominance components of the pixels in the reconstructed image frame according to the first classification mode (i.e., the primary classification manner). An optimal classification sub-mode (also referred to as a first optimal classification sub-mode) may be selected from the first classification sub-mode (i.e., the sub-mode 1-0, which classifies the pixels in the reconstructed image frame into 17 categories), the second classification sub-mode (i.e., the sub-mode 1-1, which classifies the pixels in the reconstructed image frame into 9 categories), and the third classification sub-mode (i.e., the sub-mode 1-2, which classifies the pixels in the reconstructed image frame into 1 category). The first optimal classification sub-mode may also be referred to as the primary classification manner. A primary compensation value corresponding to the optimal classification sub-mode may be obtained and used to compensate the reconstructed image frame. As a result, the compensated image frame of the reconstructed image frame may be obtained. Further, the pixels in the compensated image frame may be classified by classifying the chrominance components of the pixels in the compensated image frame according to the second classification mode. An optimal classification sub-mode (also referred to as a second optimal classification sub-mode) may be selected from the classification sub-modes (if the first optimal classification sub-mode is the sub-mode 1-0 or sub-mode 1-1, the classification sub-modes include 16 classification sub-modes; if the first optimal classification sub-mode is the sub-mode 1-2, the classification sub-modes include 96 classification sub-modes). The second optimal classification sub-mode may also be referred to as the secondary classification manner. A secondary compensation value corresponding to the optimal classification sub-mode may be obtained and used to compensate the compensated image frame.

In some embodiments, in an encoding end (e.g., the encoder 120 illustrated in FIG. 1), a code stream of the compensated image frame may be obtained by encoding the compensated image frame using the secondary compensation value of each category of pixels in the compensated image frame. The code stream may include a syntactic element. The syntactic element may include the secondary compensation values categories of pixels in the compensated image frame, coding units that need to be compensated in the reconstructed image frame, and coding units that need to be compensated in the compensated image frame. In a decoding end (e.g., the decoder 140 illustrated in FIG. 1), the secondary compensation values, the coding units that need to be compensated in the reconstructed image frame, and the coding units that need to be compensated in the compensated image frame may be decoded according to the syntax element. Further, the decoding end may use the secondary compensation values, the coding units that need to be compensated in the reconstructed image frame, and the coding units that need to be compensated in the compensated image frame to decode the code stream.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 5 is a flowchart illustrating an exemplary process for determining and transmitting at least one parameter set according to some embodiments of the present disclosure. In some embodiments, process 500 may be implemented by an image compensation system (e.g., an image compensation system 600 illustrated in FIG. 6). In some embodiments, the image compensation system may be implemented by software and/or hardware, and/or may be integrated into an image compensation device (e.g., an image compensation device 700 illustrated in FIG. 7) that includes a processing device (e.g., a processing device 710). In some embodiments, at least part of process 500 may be performed by the processing device including at least one processor and a storage device (e.g., a storage 720). For example, process 500 may be stored in the storage device in the form of instructions (e.g., an application), and invoked and/or executed by the processing device. The operations of the illustrated process presented below are intended to be illustrative. In some embodiments, process 500 may be accomplished with one or more additional operations not described, and/or without one or more of the operations discussed. Additionally, the order in which the operations of the process 500 as illustrated in FIG. 5 and described below is not intended to be limiting.

In 510, at least one parameter set may be determined. In some embodiments, operation 510 may be performed by the compensation module 640.

In some embodiments, a parameter set may be configured to compensate the reconstructed image frame. In some embodiments, each set of the at least one parameter set may include one classification manner of a primary classification manner or a secondary classification manner and a compensation value corresponding to the classification manner. For example, the first classification mode and compensation values corresponding to the first classification mode may be the parameter set. As another example, the combination of the first classification mode and the second classification mode and compensation values corresponding to the combination of the first classification mode and the second classification mode may be the parameter set.

In some embodiments, the at least one parameter set may be applied to a chrominance component of the reconstructed image frame or the compensated image frame.

In some embodiments, parameter sets applied to reconstructed image frames (or the compensated image frame) with different color components (e.g., the chrominance component, the luminance components) may be the same or partly the same. For example, if two parameter sets are applied, one of the two parameter sets may include 34 compensation values corresponding to a chrominance component Y, 100 compensation values corresponding to a luminance component U, and 256 compensation values corresponding to a luminance component V, and the other of the two parameter sets may include 85 compensation values corresponding to the chrominance component Y, 256 compensation values corresponding to the luminance component U, and 128 compensation values corresponding to the luminance component V.

In 520, the classification manner and the corresponding compensation value in the each set of the at least one parameter set may be transmitted, based on a serial number of the each set of the at least one parameter set, from the encoding end to the decoding end. In some embodiments, operation 520 may be performed by the compensation module 640.

In some embodiments, whether to apply the at least one parameter set to the reconstructed image frame or the compensated image frame may be determined based on an opening situation of a filtering operation in a syntactic representation associated with the reconstructed image frame or the compensated image frame. In some embodiments, for each coding unit in the reconstructed image frame (or the compensated image frame), the opening situation of the filtering operation may be determined and recorded. If the filtering operation is opened for the coding unit, the coding unit may need to be compensated and may be compensated based on the compensation value in a parameter set corresponding to the coding unit. In some embodiments, the opening situation of the filtering operation may be determined by determining whether the coding unit has a filter flag. For example, the coding unit may have a flag 0 or a flag 1. The flag 1 may indicate that the coding unit has the filter flag and needs to be filtered. The flag 0 may indicate that the coding unit has no filter flag and does not need to be filtered. If each of the coding units in the reconstructed image frame (or the compensated image frame) has the filter flag, the coding units in the reconstructed image frame (or the compensated image frame) may be encoded respectively by using a plurality of parameter sets.

In some embodiments, a serial number of the parameter set used by a coding unit during the coding of the coding unit may be recorded. For example, the coding unit may have a serial number 0 or a serial number 1. The serial number 0 may indicate a first parameter set. The serial number 1 may indicate a second parameter set. If the first parameter set is used by the coding unit, the serial number 0 may be recorded. If the second parameter set is used by the coding unit, the serial number 1 may be recorded.

In some embodiments, parameter sets of coding units at a same position in the reconstructed image frames (or the compensated image frame) with different color components may be indicated by a same serial number. For example, for a reconstructed image frame corresponding to a chrominance component Y, if a specific coding unit has a filter flag, and the first parameter set is used (i.e., the preset serial number 0 is recorded), a coding unit at a same position in a reconstructed image frame corresponding to a luminance component U as the specific coding unit may be directly encoded using the first parameter set.

In some embodiments, if counts of parameter sets respectively corresponding to the chrominance component Y component, the luminance component U, and the luminance component V are different, the parameter sets may not share a same serial number. If counts of parameter sets respectively corresponding to two of the chrominance component Y component, the luminance component U, and the luminance component V are the same, the parameter sets may not share a same serial number, or may share the same serial number when coding units respectively with the two of the chrominance component Y component, the luminance component U, and the luminance component V have filter flags at the same time. If the counts of the parameter sets respectively corresponding to the three components are the same, the parameter sets of certain coding units with the same position in coding units respectively with the three components may share the same preset serial number, or the parameter sets respectively corresponding to two of the three components may be set to share a preset serial number, or the parameter sets respectively corresponding to the three components may be set to not share a preset serial number (i.e., the filter flags of the coding units respectively with the three components may be set respectively). The components that share the preset serial number may be set to share a same filter switch when the filtering operation of coding units with the components is opened.

In some embodiments, a code stream of the reconstructed image frame or the compensated image frame may include a syntactic element. The syntactic element may at least include a plurality of the parameter sets, the filter flag, and preset serial numbers of the plurality of the parameter sets associated with the reconstructed image frame or the compensated image frame.

Generally, a same parameter set is applied to an entire reconstructed image frame, i.e., all coding units in the reconstructed image frame are compensated based on a same classification mode, which is relatively rough. In the embodiments in the present disclosure, a plurality of the parameter sets may be provided to compensate different coding units in the reconstructed image frame (or the compensated image frame), so that more suitable parameter sets may be applied to the coding units, which may realize the adaptive compensation of the coding units. As a result, the pixel values of the pixels in the reconstructed image frame (or the compensated image frame) may be better corrected, thereby improving the compensation effect and the coding efficiency of the reconstructed image frame (or the compensated image frame).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 6:
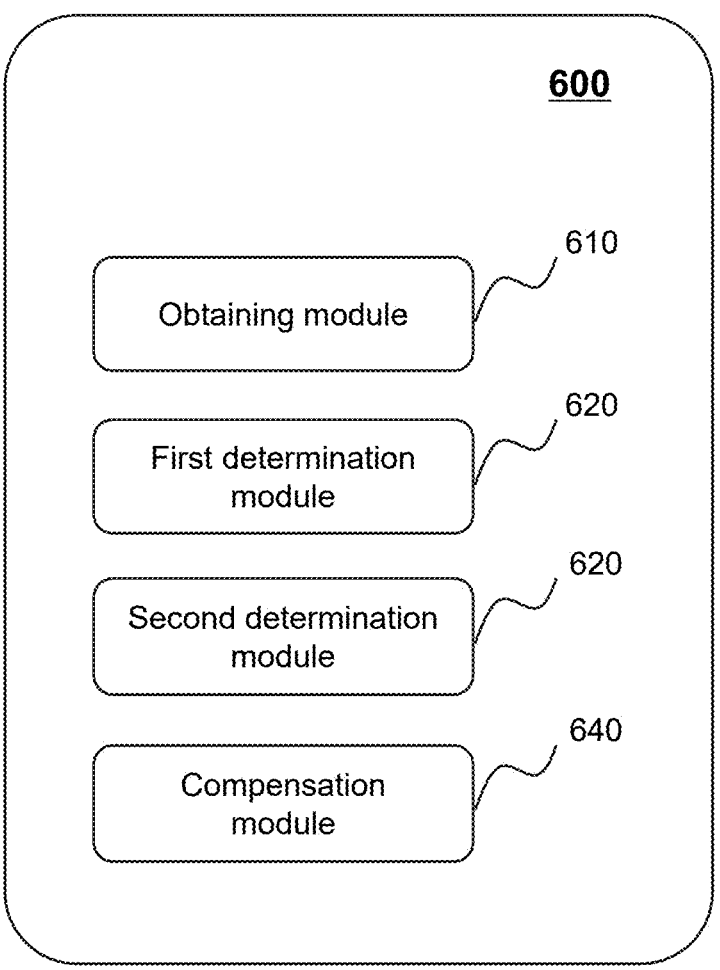
FIG. 6 is a block diagram illustrating an exemplary image compensation system according to some embodiments of the present disclosure.

FIG. 6 is a block diagram illustrating an exemplary image compensation system according to some embodiments of the present disclosure. As shown in FIG. 6, a system 600 may include an obtaining module 610, a first determination module 620, a second determination module 630, and a compensation module 640.

The obtaining module 610 may be configured to obtain a reconstructed image frame. More descriptions regarding the obtaining of the reconstructed image frame may be found elsewhere in the present disclosure, for example, operation 210 in FIG. 2 and relevant descriptions thereof.

The first determination module 620 may be configured to determine a primary classification manner of pixels in the reconstructed image frame. More descriptions regarding the determining of the primary classification manner may be found elsewhere in the present disclosure, for example, operation 220 in FIG. 2 and relevant descriptions thereof.

The second determination module 630 may be configured to determine a primary compensation value of each category of pixels in the reconstructed image frame that are classified based on the primary classification manner. More descriptions regarding the determining of the primary compensation value of each category of pixels in the reconstructed image frame may be found elsewhere in the present disclosure, for example, operation 230 in FIG. 2 and relevant descriptions thereof.

The compensation module 640 may be configured to obtain a compensated image frame by compensating the reconstructed image frame based on the primary compensation value of each category of pixels in the reconstructed image frame. More descriptions regarding the obtaining of the compensated image frame may be found elsewhere in the present disclosure, for example, operation 240 in FIG. 2 and relevant descriptions thereof.

In some embodiments, the compensation module 640 may be further configured to determine a secondary classification manner of the pixels in the compensated image frame, determine a secondary compensation value of each category of pixels in the compensated image frame that are classified based on the secondary classification manner, and compensate the compensated image frame based on the secondary compensation value of the each category of pixels in the compensated image frame. More descriptions regarding the compensating of the compensated image frame may be found elsewhere in the present disclosure, for example, FIG. 4 and relevant descriptions thereof.

In some embodiments, the compensation module 640 may be further configured to determine at least one parameter set and transmit one classification manner (e.g., the primary classification manner, the secondary classification manner) and a compensation value corresponding to the classification manner in each set of the at least one parameter set based on a preset serial number of the each set of the at least one parameter set. More descriptions regarding the at least one parameter set may be found elsewhere in the present disclosure, for example, FIG. 5 and relevant descriptions thereof.

The modules in the image compensation system 600 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units.

Figure 7:
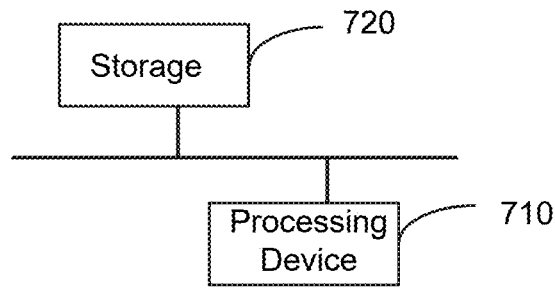
FIG. 7 is a schematic diagram illustrating an exemplary video processing device according to some embodiments of the present disclosure.

FIG. 7 is a schematic diagram illustrating an exemplary video processing device according to some embodiments of the present disclosure. In some embodiments, the video processing system 100 and/or the image compensation system 600 may be implemented by software and/or hardware, and/or may be integrated into the video processing device 700.

As shown in FIG. 7, the video processing device 700 may include a processing device 710 (also referred to as a processor). The processing device may be configured to process information and/or data relating to the image compensation to perform one or more functions described in the present disclosure. For example, the processing device 710 may be configured to implement any one of the embodiments or any combination thereof in the present disclosure.

In some embodiments, the processing device 710 may include a central processing unit (CPU). In some embodiments, the processing device 710 may include an integrated circuit chip configured to process signals. In some embodiments, the processing device 710 may include a general-purpose processor, a digital signal processor (DSP), an application specific integrated circuit (ASIC), a field programmable gate array (FPGA), other programmable logic device, a discrete gate, a transistor logic device, a discrete hardware component, or the like, or any combination thereof. The general-purpose processor may include a microprocessor. In some embodiments, the processing device 710 may include any conventional processor.

In some embodiments, the video processing device 700 may include a storage 720. The storage 720 may be configured to store instructions and/or data required for operations of the processing device 710. In some embodiments, the storage 720 may include a medium that may store program codes, such as a U disk, a mobile hard disk, a read-only memory (ROM), a random access memory (RAM), a magnetic disk, an optical disk, or the like, or any combination thereof. In some embodiments, the storage 720 may include terminal devices such as a computer, a server, a mobile phone, a tablet, or the like, or any combination thereof.

Figure 8:
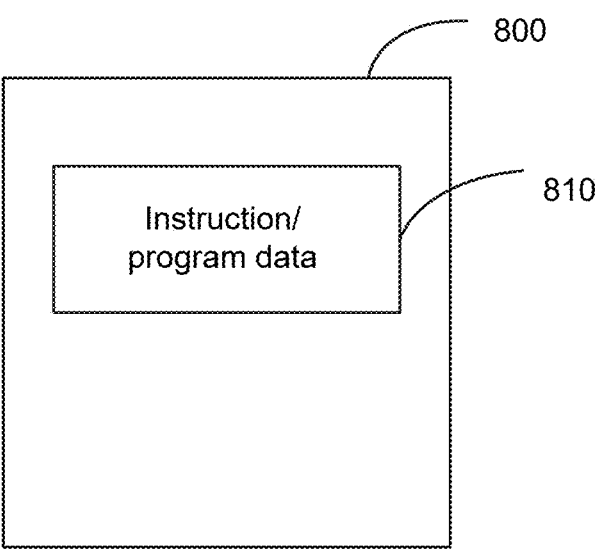
FIG. 8 is a schematic diagram illustrating an exemplary computer-readable storage medium according to some embodiments of the present disclosure.

FIG. 8 is a schematic diagram illustrating an exemplary computer-readable storage medium according to some embodiments of the present disclosure. The computer-readable storage medium 800 may be configured to store instruction/program data 810. When the instruction/program data 810 is executed, any one of the embodiments of the image compensation method may be implemented. In some embodiments, the instruction/program data 810 may be in a form of a program file and stored in the storage 820 in a form of a software product. A computer device (e.g., the video processing system 100, the image compensation system 500, the video processing device 700) personal computer, a server, or a network device, etc.) or a processor may perform all or part of the operations of the embodiments of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:
1. A method, comprising:
  obtaining a reconstructed image frame;

determining a classification manner of pixels in the reconstructed image frame, wherein the classification manner includes a first classification mode and a second classification mode;

classifying the pixels in the reconstructed image frame into at least one first category based on the first classification mode, wherein the first classification mode includes a first classification sub-mode, the pixels in the reconstructed image frame are classified into 17 categories based on the first classification sub-mode, and a formula of the first classification sub-mode is shown below:

Initial: Cl=0;
for $|k_1-i|\leq1$, $|k_2-j|\leq1$:
   if $Y_{(k_1,k_2)}>Y_{(i,j)}$:
      Cl+=1
   else if $Y_{(k_1,k_2)}<Y_{(i,j)}$:
      Cl+=−1, where different values of Cl refer to different categories, $Y_{(i,j)}$ refers to a pixel value of a current pixel (i, j), $Y_{(k_1,k_2)}$ refers to a pixel value of a surrounding pixel ($k_1$, $k_2$) of the current pixel, a value range of Cl in the first classification sub-mode is [−8, 8], which includes 17 values each of which corresponds to a category;

classifying the pixels in the reconstructed image frame into at least one second category based on the second classification mode;

determining compensation values of the pixels in the reconstructed image frame based on the at least one first category and the at least one second category; and obtaining a compensated image frame by compensating the reconstructed image frame based on the compensation values of the pixels in the reconstructed image frame.

2. The method of claim 1, wherein the method further includes:

determining a secondary classification manner of the pixels in the compensated image frame, the secondary classification manner is the first classification mode;

determining a secondary compensation value of each category of pixels in the compensated image frame that are classified based on the secondary classification manner; and compensating the compensated image frame based on the secondary compensation value of the each category of pixels in the compensated image frame.

3. The method of claim 2, wherein a code stream of the reconstructed image frame or the compensated image frame includes a syntactic element, the syntactic element at least includes a plurality of parameter sets, a filter flag, and preset serial numbers of the plurality of parameter sets associated with the reconstructed image frame or the compensated image frame, the plurality of parameter sets are provided to compensate different coding units in the reconstructed image frame or the compensated image frame, and the method further includes:

determining at least one parameter set, each set of the at least one parameter set including one classification manner of the classification manner or the secondary classification manner and a compensation value corresponding to the classification manner; and transmitting the classification manner and the corresponding compensation value in the each set of the at least one parameter set based on a preset serial number of the each set of the at least one parameter set, wherein parameter sets of coding units at a same position in the reconstructed image frame or the compensated image frame with different color components are indicated by a same serial number.

4. The method of claim 3, wherein the at least one parameter set is applied to a chrominance component of the reconstructed image frame or the compensated image frame.

5. The method of claim 3, wherein the method further includes:

determining, based on an opening situation of a filtering operation in a syntactic representation associated with the reconstructed image frame or the compensated image frame, whether to apply the at least one parameter set to the reconstructed image frame or the compensated image frame.

6. The method of claim 1, wherein the first classification mode further includes a second classification sub-mode or a third classification sub-mode, the pixels in the reconstructed image frame are classified into 9 categories based on the second classification sub-mode, and the pixels in the reconstructed image frame are classified into 1 category based on the third classification sub-mode.

7. The method of claim 6, wherein a formula of the second classification sub-mode is shown below Initial: Cl=0;
for $|k_1-i|\leq1$, $|k_2-j|\leq1$:
   if $Y_{(k_1,k_2)}>Y_{(i,j)}$:
      Cl+=1, where a value range of Cl in the second classification sub-mode is [0, 8], which includes 9 values each of which corresponds to a category.

8. The method of claim 7, wherein if the first classification mode is the first classification sub-mode or the second classification sub-mode, the second classification mode includes one of 16 classification sub-modes, if the first classification mode is the third classification sub-mode, the second classification mode includes one of 96 classification sub-modes; and pixel values of the pixels in the reconstructed image frame are divided into multiple ranges based on each classification sub-mode in the second classification mode.

9. The system of claim 1, wherein the first classification mode is configured to classify the pixels in the reconstructed image frame based on the current pixel in the reconstructed image frame and surrounding pixels of the current pixel, and the second classification mode is configured to classify the pixels in the reconstructed image frame based on pixel values of the pixels in the reconstructed image frame.

10. The system of claim 1, wherein the first classification mode further includes a second classification sub-mode, the pixels in the reconstructed image frame are classified into 9 categories based on the second classification sub-mode, and a formula of the second classification sub-mode is shown below Initial: Cl=0;
for $|k_1-i|\leq1$, $|k_2-j|\leq1$:
   if $Y_{(k_1,k_2)}>Y_{(i,j)}$:
      Cl+=1, where a value range of Cl in the second classification sub-mode is [0, 8], which includes 9 values each of which corresponds to a category.

11. A system, comprising:

at least one storage device including a set of instructions; and at least one processor in communication with the at least one storage device, wherein when executing the set of instructions, the at least one processor is directed to perform operations including:

obtaining a reconstructed image frame;

determining a classification manner of pixels in the reconstructed image frame, wherein the classification manner includes a first classification mode and a second classification mode;

determining a compensation value of each category of pixels in the reconstructed image frame that are classified based on the classification manner, wherein the first classification mode includes a first classification sub-mode, the pixels in the reconstructed image frame are classified into 17 categories based on the first classification sub-mode, and a formula of the first classification sub-mode is shown below:

Initial: Cl=0;

for $|k_1-i|\leq1$, $|k_2-j|\leq1$:

if $Y_{(k_1,k_2)}>Y_{(i,j)}$:

Cl+=1 else if $Y_{(k_1,k_2)}<Y_{(i,j)}$:

Cl+=−1, where different values of Cl refer to different categories, $Y_{(i,j)}$ refers to a pixel value of a current pixel (i, j), $Y_{(k_1,k_2)}$ refers to a pixel value of a surrounding pixel $(k_1, k_2)$ of the current pixel, a value range of Cl in the first classification sub-mode is [−8, 8], which includes 17 values each of which corresponds to a category; and obtaining a compensated image frame by compensating the reconstructed image frame based on the compensation value of each category of pixels in the reconstructed image frame.

12. The system of claim 11, wherein the operations further include:

determining a secondary classification manner of the pixels in the compensated image frame, the secondary classification manner is the first classification mode;

determining a secondary compensation value of each category of pixels in the compensated image frame that are classified based on the secondary classification manner; and compensating the compensated image frame based on the secondary compensation value of the each category of pixels in the compensated image frame.

13. The system of claim 11, wherein a code stream of the reconstructed image frame or the compensated image frame includes a syntactic element, the syntactic element at least includes a plurality of parameter sets, a filter flag, and preset serial numbers of the plurality of parameter sets associated with the reconstructed image frame or the compensated image frame, the plurality of parameter sets are provided to compensate different coding units in the reconstructed image frame or the compensated image frame, and the operations further includes:

determining at least one parameter set, each set of the at least one parameter set including one classification manner of the classification manner or the secondary classification manner and a compensation value corresponding to the classification manner; and transmitting the classification manner and the corresponding compensation value in the each set of the at least one parameter set based on a preset serial number of the each set of the at least one parameter set, wherein parameter sets of coding units at a same position in the reconstructed image frame or the compensated image frame with different color components are indicated by a same serial number.

14. The system of claim 13, wherein the at least one parameter set is applied to a chrominance component of the reconstructed image frame or the compensated image frame.

15. The system of claim 13, wherein the operations further include:

determining, based on an opening situation of a filtering operation in a syntactic representation associated with the reconstructed image frame or the compensated image frame, whether to apply the at least one parameter set to the reconstructed image frame or the compensated image frame.

16. The system of claim 11, wherein the classification manner is a combination of the first classification mode and the second classification mode, and the first classification mode and the second classification mode are combined using a Cartesian product algorithm.

17. The system of claim 11, wherein the first classification mode further includes a second classification sub-mode or a third classification sub-mode, the pixels in the reconstructed image frame are classified into 9 categories based on the second classification sub-mode, and the pixels in the reconstructed image frame are classified into 1 category based on the third classification sub-mode.

18. The system of claim 17, wherein a formula of the second classification sub-mode is shown below Initial: Cl=0;

for $|k_1-i|\leq1$, $|k_2-j|\leq1$:

if $Y_{(k_1,k_2)}>Y_{(i,j)}$:

Cl+=1, where a value range of Cl in the second classification sub-mode is [0, 8], which includes 9 values each of which corresponds to a category.

19. The system of claim 18, wherein if the first classification mode is the first classification sub-mode or the second classification sub-mode, the second classification mode includes one of 16 classification sub-modes, if the first classification mode is the third classification sub-mode, the second classification mode includes one of 96 classification sub-modes; and pixel values of the pixels in the reconstructed image frame are divided into multiple ranges based on each classification sub-mode in the second classification mode.

20. A non-transitory computer readable medium, comprising executable instructions that, when executed by at least one processor, direct the at least one processor to perform a method, the method comprising:

obtaining a reconstructed image frame;

determining a classification manner of pixels in the reconstructed image frame, wherein the classification manner includes a first classification mode and a second classification mode;

determining a compensation value of each category of pixels in the reconstructed image frame that are classified based on the classification manner, wherein the first classification mode includes a first classification sub-mode, the pixels in the reconstructed image frame are classified into 17 categories based on the first classification sub-mode, and a formula of the first classification sub-mode is shown below:

Initial: Cl=0;

for $|k_1-i|\leq1$, $|k_2-j|\leq1$:

if $Y_{(k_1,k_2)}>Y_{(i,j)}$:

Cl+=1 else if $Y_{(k_1,k_2)} < Y_{(i,j)}$:

Cl+=−1, where different values of Cl refer to different categories,
$Y_{(i,j)}$ refers to a pixel value of a current pixel (i, j),
$Y_{(k_1,k_2)}$ refers to a pixel value of a surrounding pixel ($k_1$, $k_2$) of the current pixel, a value range of Cl in the first classification sub-mode is [−8, 8], which includes 17 values each of which corresponds to a category; and obtaining a compensated image frame by compensating the reconstructed image frame based on the compensation value of each category of pixels in the reconstructed image frame.

* * * * *